US012332258B2

(12) United States Patent
Hara et al.

(10) Patent No.: US 12,332,258 B2
(45) Date of Patent: Jun. 17, 2025

(54) DISPENSING DEVICE AND METHOD

(71) Applicant: Hitachi High-Tech Corporation, Tokyo (JP)

(72) Inventors: Daisuke Hara, Tokyo (JP); Toshiki Yamagata, Tokyo (JP); Masashi Shibahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 244 days.

(21) Appl. No.: 18/013,933

(22) PCT Filed: Aug. 3, 2020

(86) PCT No.: PCT/JP2020/029640
§ 371 (c)(1),
(2) Date: Dec. 30, 2022

(87) PCT Pub. No.: WO2022/029826
PCT Pub. Date: Feb. 10, 2022

(65) Prior Publication Data
US 2023/0314455 A1 Oct. 5, 2023

(51) Int. Cl.
*G01N 35/00* (2006.01)
*G01N 35/10* (2006.01)

(52) U.S. Cl.
CPC ... *G01N 35/00623* (2013.01); *G01N 35/1011* (2013.01); *B01L 2200/146* (2013.01);
(Continued)

(58) Field of Classification Search
CPC ..... G01N 2035/103; G01N 2035/1025; G01N 2035/1013; G01N 2035/00277;
(Continued)

(56) References Cited

U.S. PATENT DOCUMENTS 4,846,003 A * 7/1989 Marquiss .............. B01L 3/0275
422/931
5,750,881 A * 5/1998 Dorenkott ............. G01F 11/021
73/864.11
(Continued)

FOREIGN PATENT DOCUMENTS

CN 101273257 B * 3/2007 ............. G01F 1/383
CN 117504964 A * 2/2024
(Continued)

OTHER PUBLICATIONS

Translation JP-2006194689 Jul. 27, 2007 (Year: 2006).*
(Continued)

*Primary Examiner* — Xin Y Zhong
*Assistant Examiner* — Monica S Young
(74) *Attorney, Agent, or Firm* — MATTINGLY & MALUR, PC

(57) ABSTRACT

The present invention determines whether or not a mounted tip and a dispensing amount match with each other in order to prevent contamination in a dispensing device. The present invention is provided with a pipette mechanism 108, 109 that performs suction and discharge, a motor 102 that drives the pipette mechanism, and a pressure sensor 113 that detects a pressure of the pipette mechanism. A dispensing tip 110 is mounted to the pipette mechanism. A control computer 116 controls the motor 102, drives the pipette mechanism in a suction or discharge direction, and determines a type of the dispensing tip 110 on the basis of a difference in pressure waveform detected by the pressure sensor 113.

8 Claims, 11 Drawing Sheets

(52) U.S. Cl.
CPC .............. *G01N 2035/00277* (2013.01); *G01N 2035/1013* (2013.01); *G01N 2035/1025* (2013.01); *G01N 2035/103* (2013.01)

(58) Field of Classification Search
CPC ......... G01N 35/1011; G01N 35/00732; G01N 35/1016; G01N 35/00623; B01L 2200/146; B01L 3/0275; B01L 3/0237
USPC .................................................... 73/864, 110
See application file for complete search history.

(56) References Cited

U.S. PATENT DOCUMENTS

| | | | | |
|---|---|---|---|---|
| 6,158,269 | A * | 12/2000 | Dorenkott | G01N 1/38 422/562 |
| 11,525,839 | B2 * | 12/2022 | Pawlowski | G01N 35/1016 |
| 2003/0019305 | A1 * | 1/2003 | Richter | G01F 11/28 73/863.02 |
| 2004/0149015 | A1 * | 8/2004 | Hansen | B01L 3/0279 73/40 |
| 2006/0051246 | A1 | 3/2006 | Toi et al. | |
| 2009/0211380 | A1 * | 8/2009 | Tajima | G01N 35/1016 73/864.11 |
| 2009/0288470 | A1 * | 11/2009 | Bentz | B01L 3/021 73/1.74 |
| 2010/0248370 | A1 * | 9/2010 | Moynahan | B25J 15/0616 435/286.1 |
| 2012/0240663 | A1 * | 9/2012 | Feldmann | B01L 3/0217 73/40.5 R |
| 2016/0045913 | A1 * | 2/2016 | Luebbert | B01L 3/021 73/864.11 |
| 2017/0354964 | A1 * | 12/2017 | Beebe | B01L 3/0275 |
| 2019/0232274 | A1 * | 8/2019 | Beebe | B01L 3/0275 |
| 2021/0003484 | A1 * | 1/2021 | Wu | G01N 35/00584 |
| 2023/0258679 | A1 * | 8/2023 | Wu | G01N 35/1011 222/41 |

FOREIGN PATENT DOCUMENTS

| | | | | |
|---|---|---|---|---|
| EP | 3671221 | A1 | 6/2020 | |
| JP | 11-94844 | A | 4/1999 | |
| JP | 2006-078202 | A | 3/2006 | |
| JP | 2006194689 | A * | 7/2006 | ............ C12M 33/04 |
| JP | 2010-256200 | A | 11/2010 | |
| WO | 2006/123771 | A | 11/2006 | |

OTHER PUBLICATIONS

Translation CN-101273257 (Year: 2007).*
Extended European Search Report received in corresponding European Application No. 20948592.9 dated Feb. 19, 2024.
International Search Report of PCT/JP2020/029640 dated Oct. 6, 2020.

* cited by examiner

[FIG. 1]
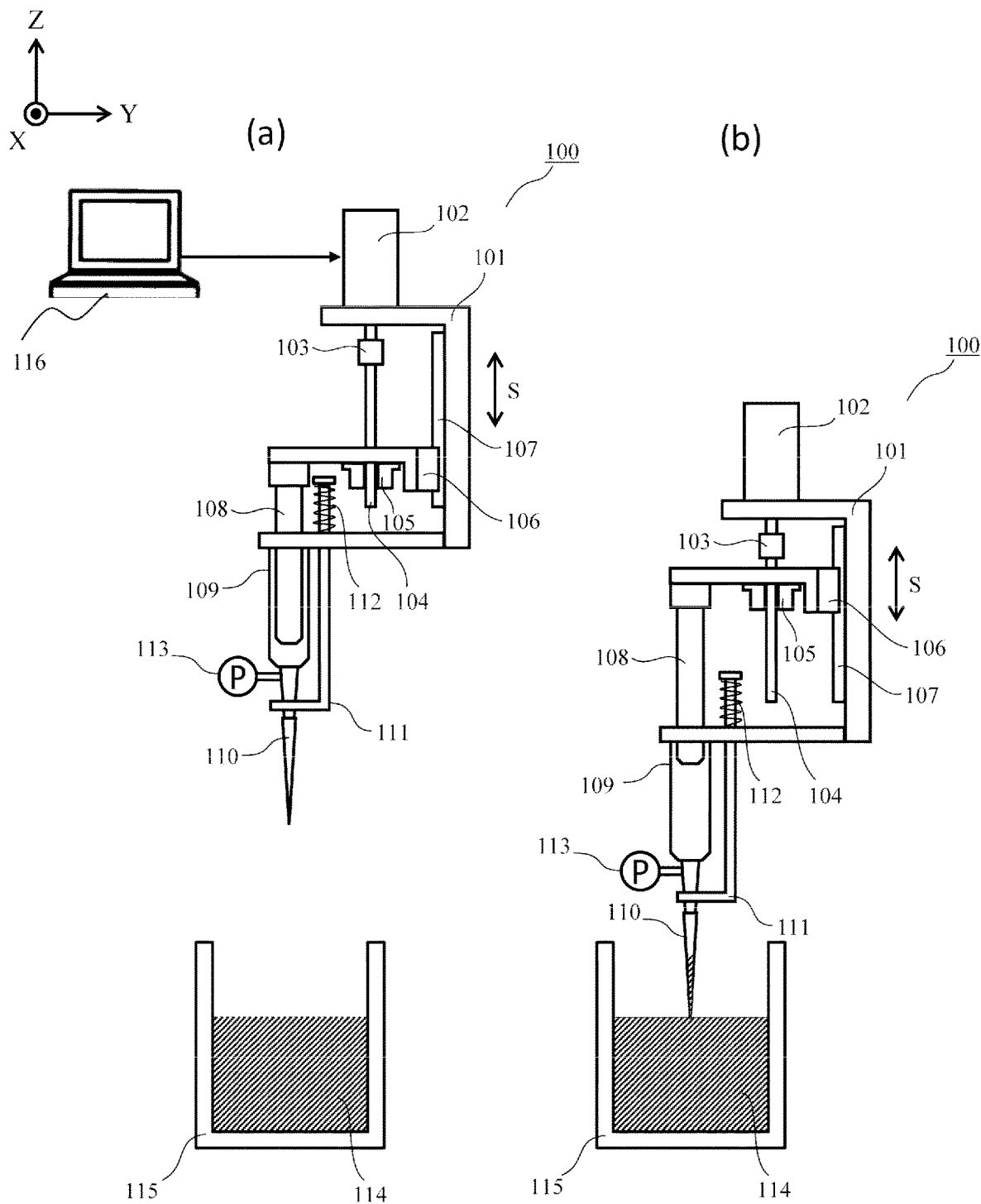

[FIG. 2]
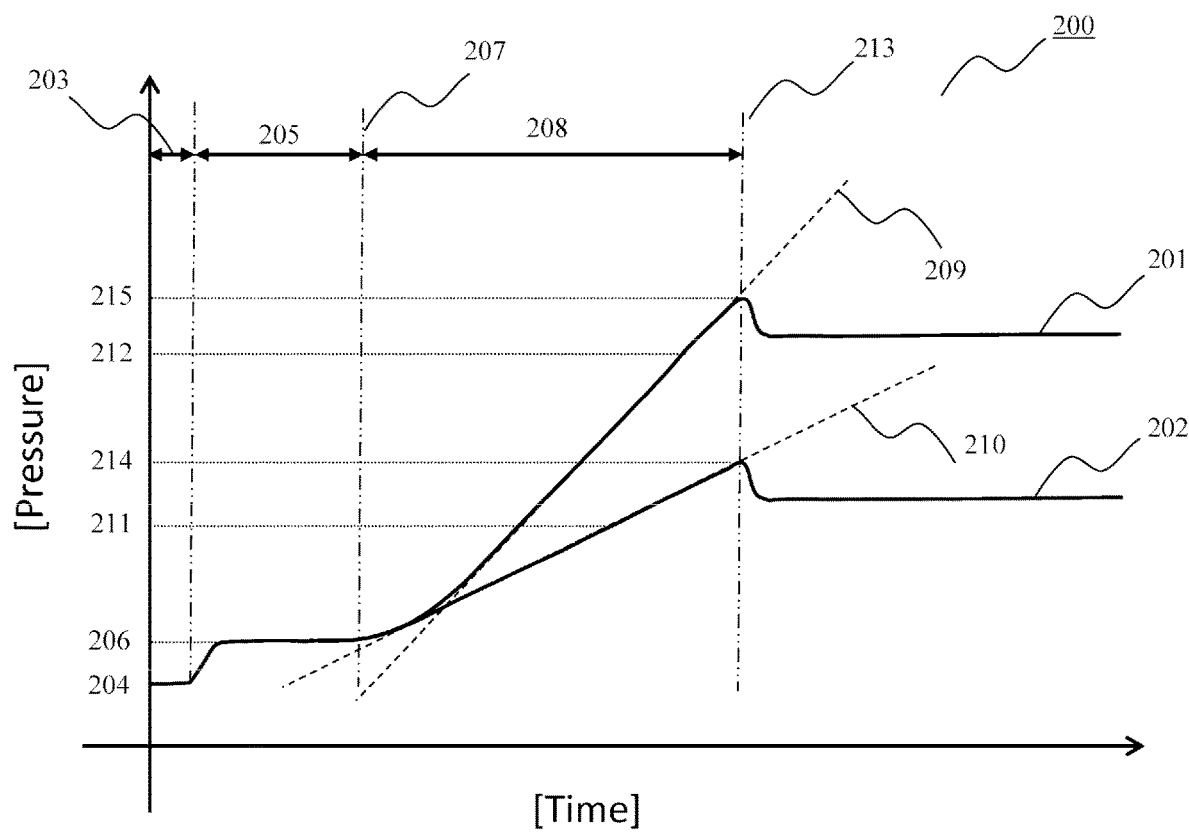

[FIG. 3]
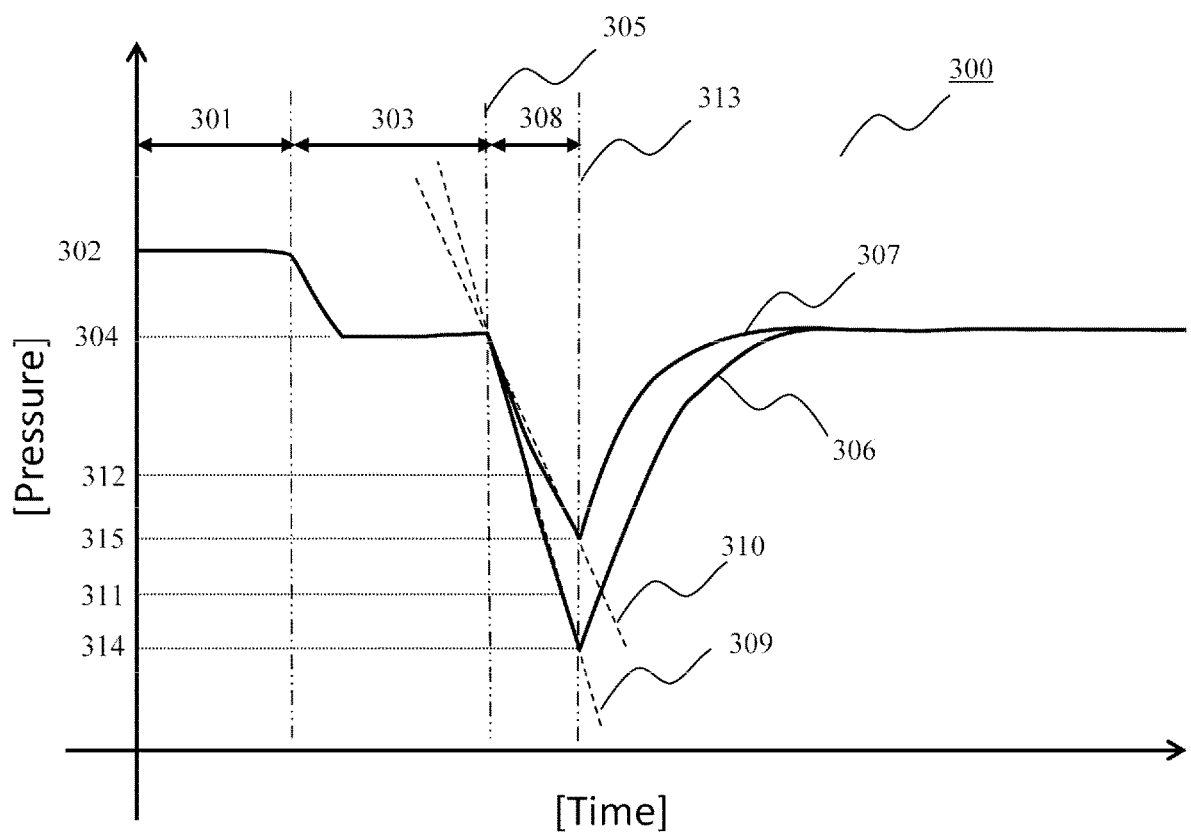

[FIG. 4]
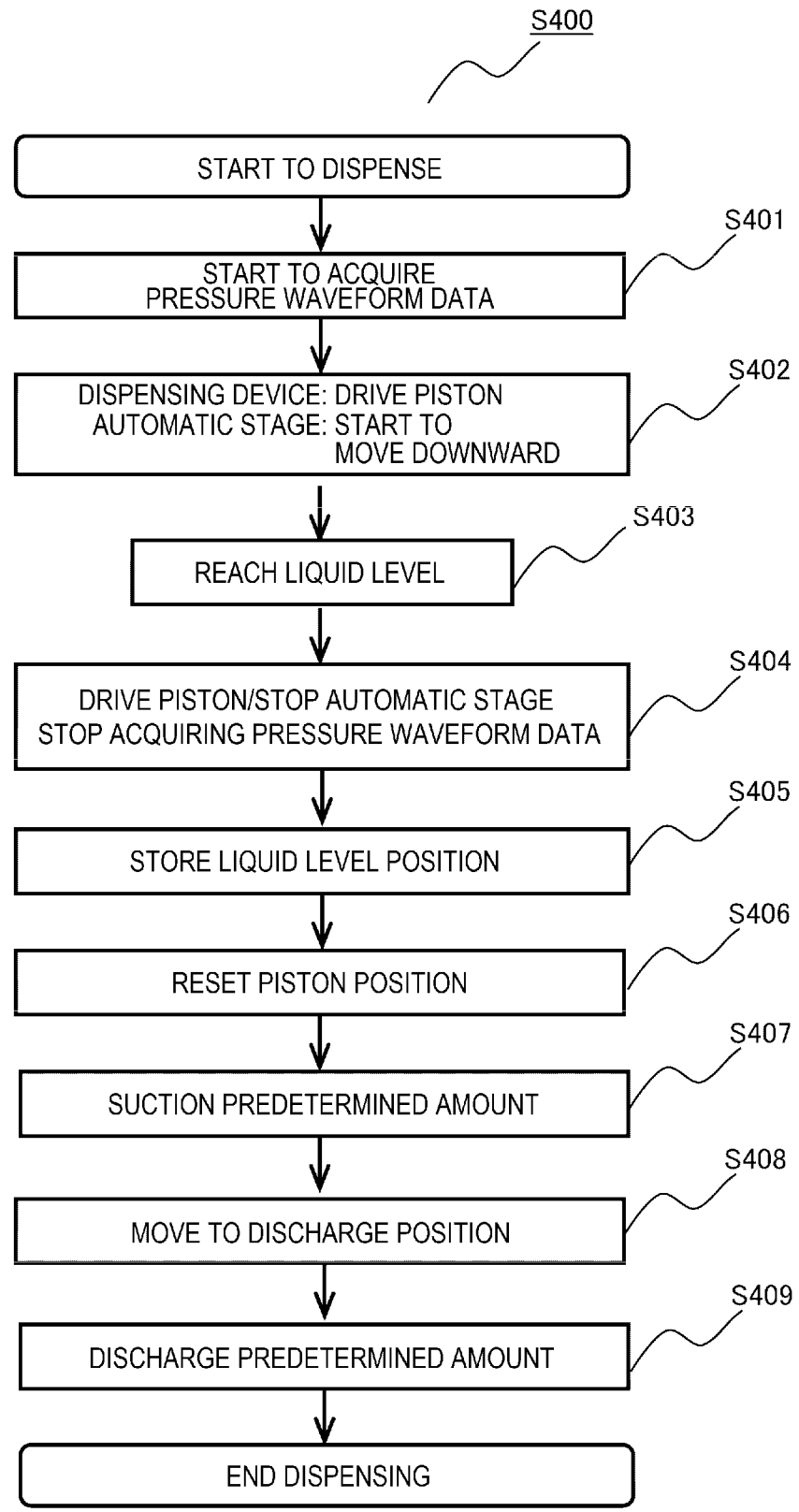

[FIG. 5]
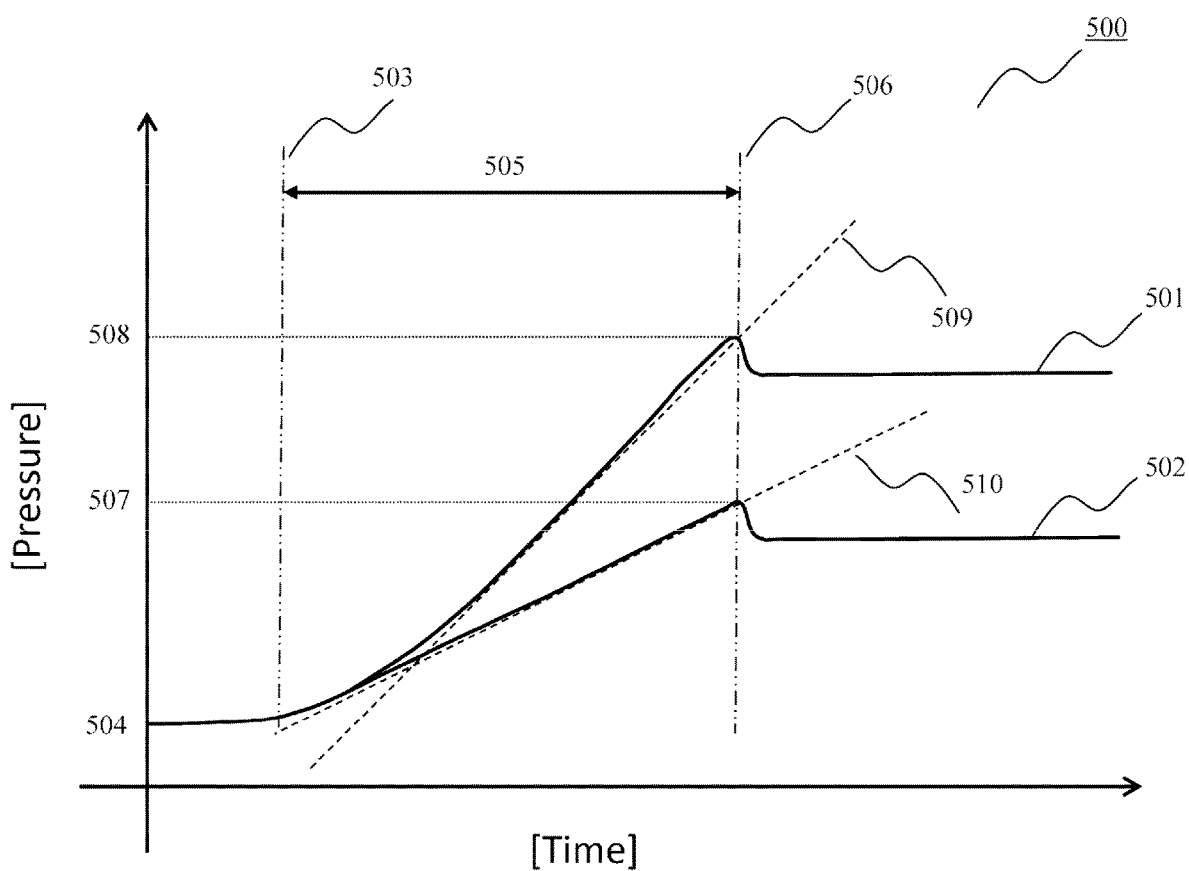

[FIG. 6]
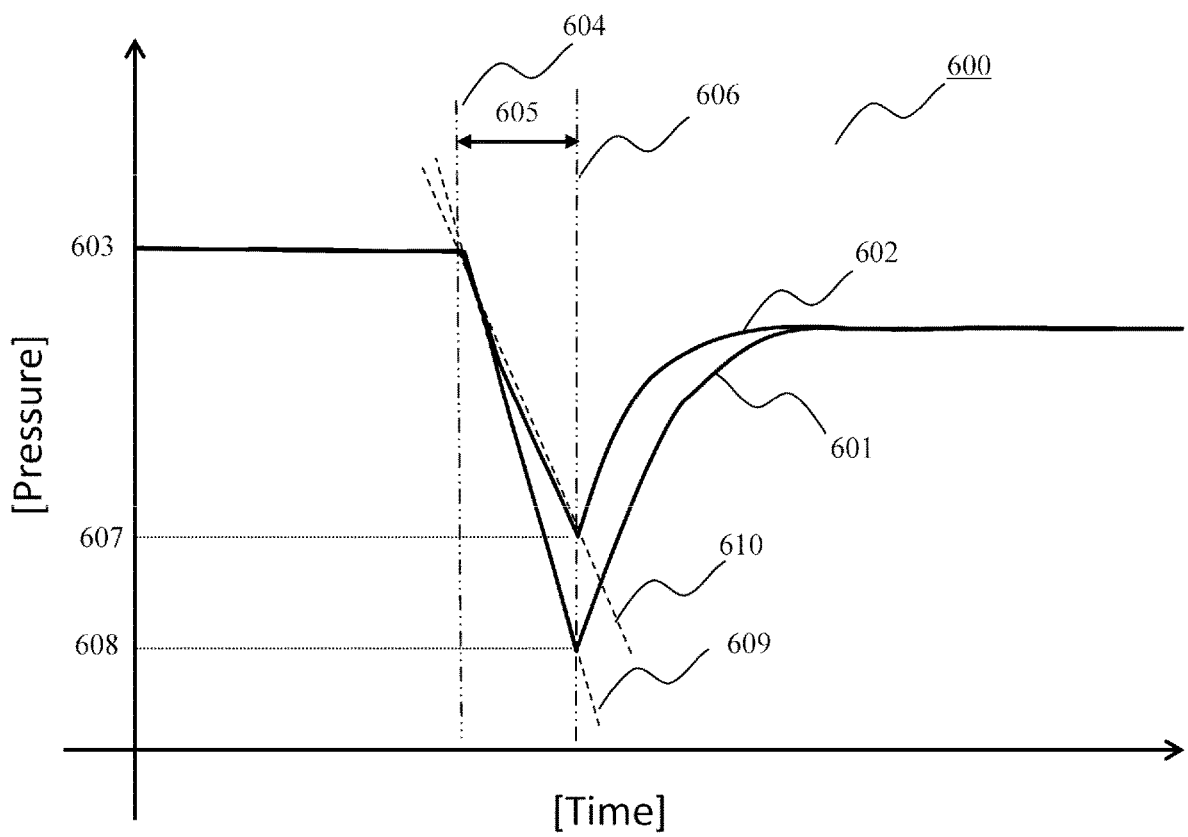

[FIG. 7]
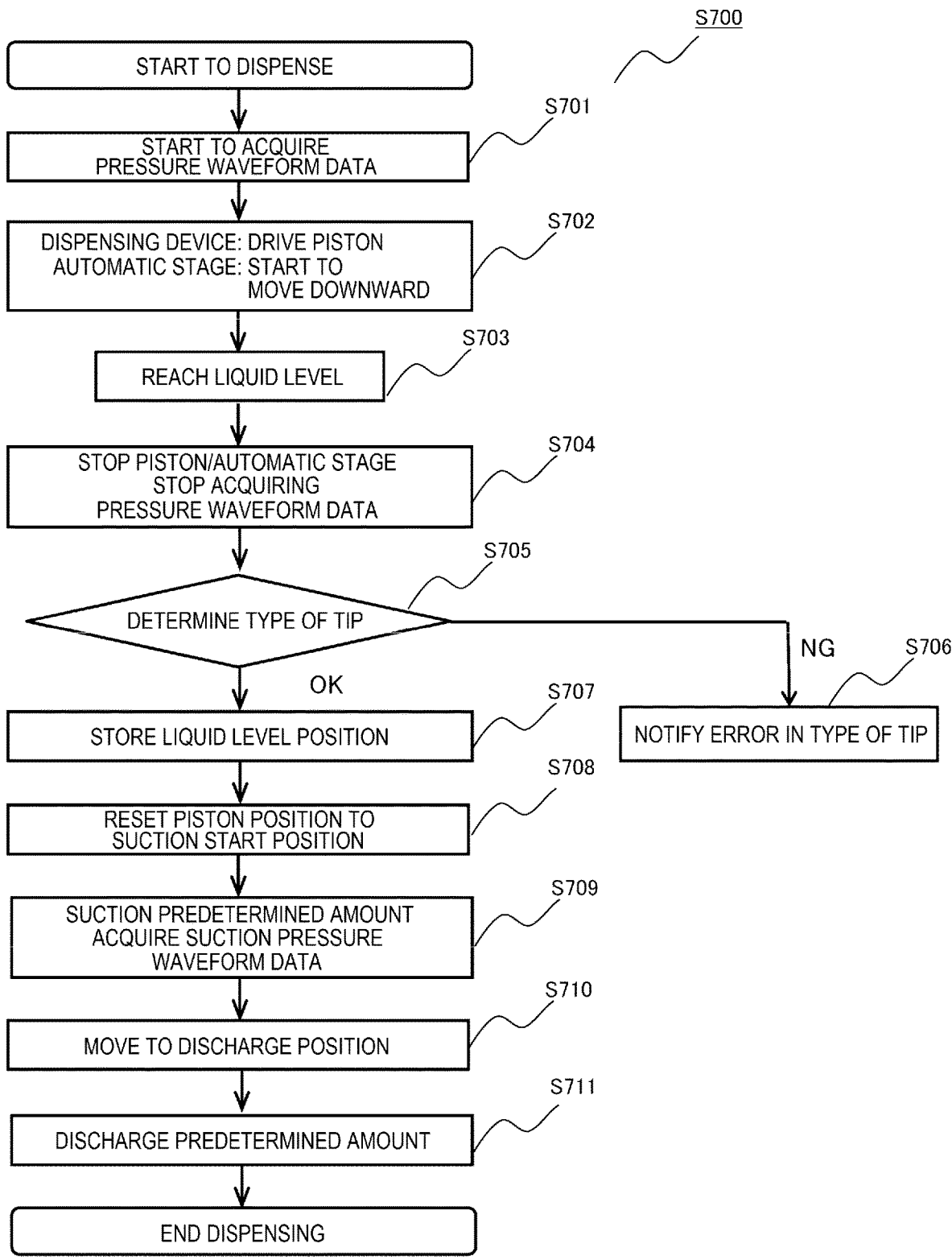

[FIG. 8]
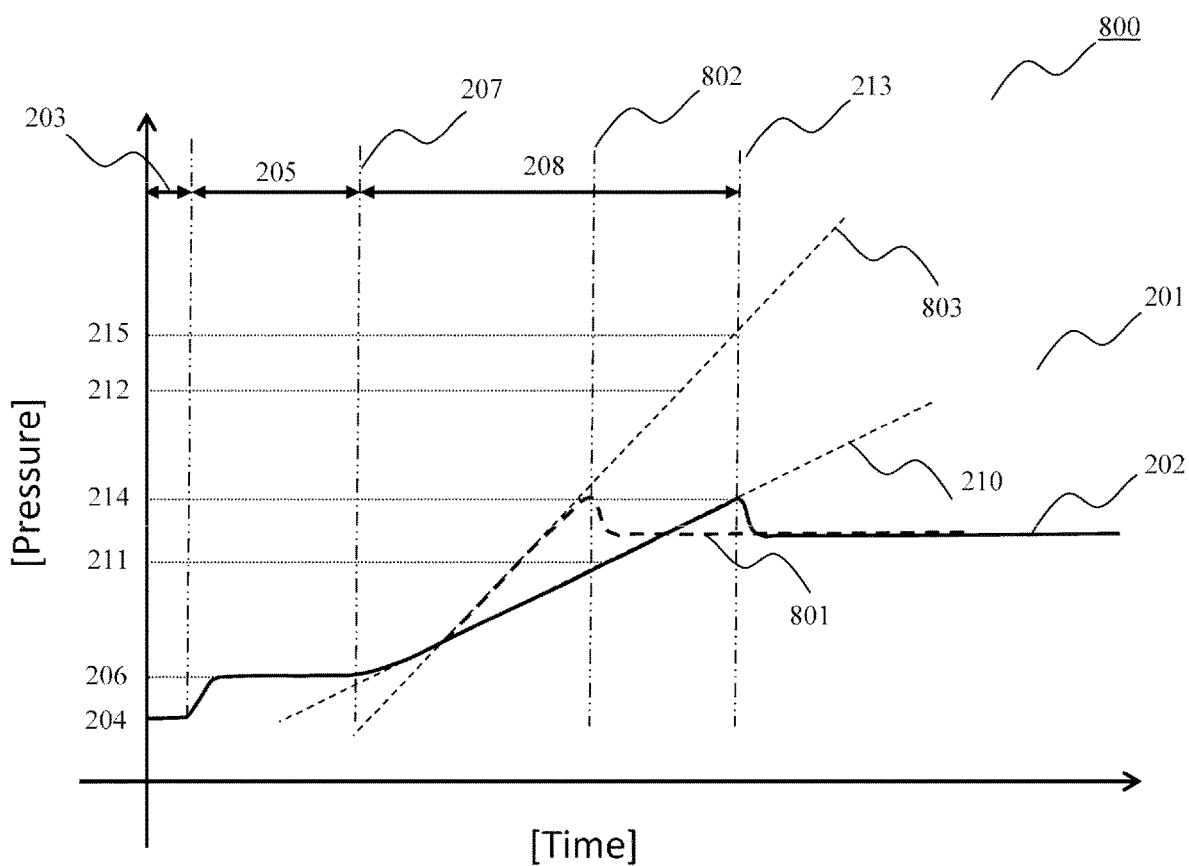

[FIG. 9]
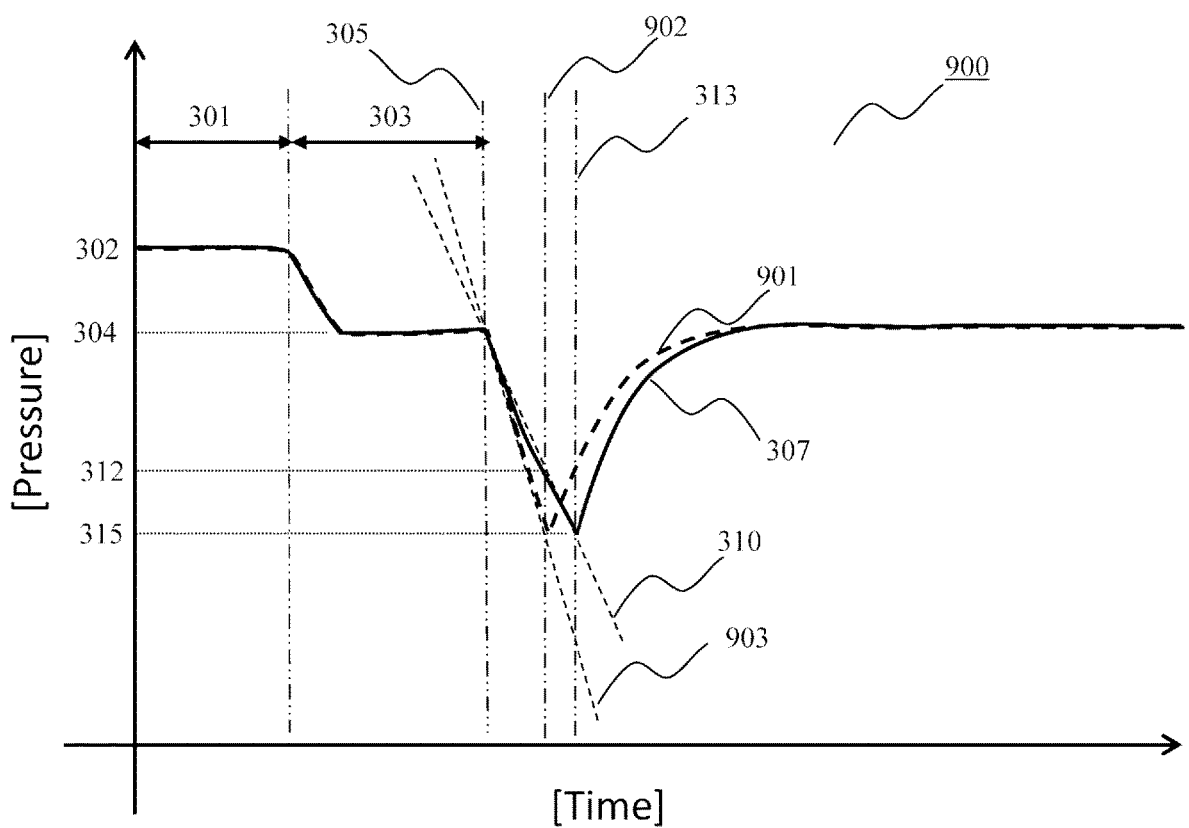

[FIG. 10]
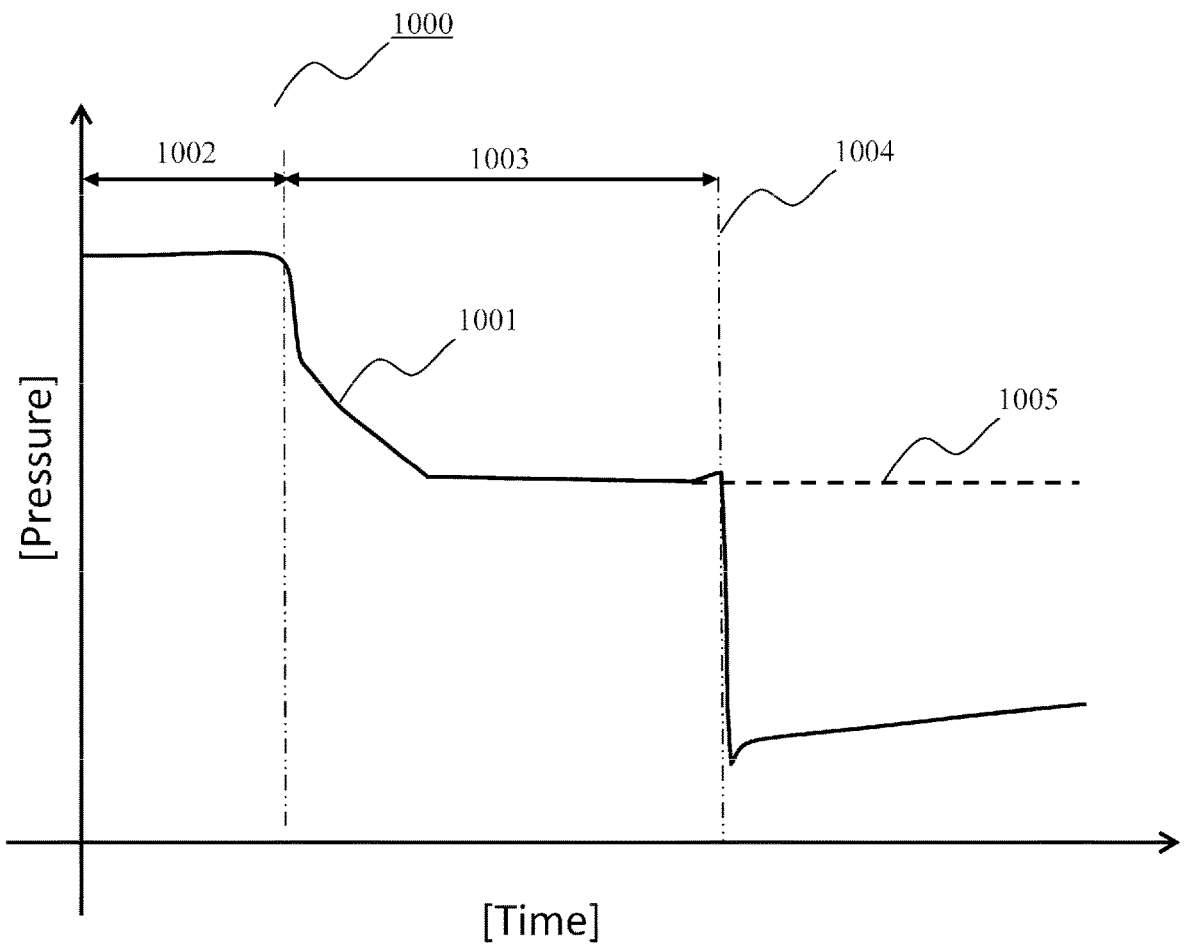

[FIG. 11]
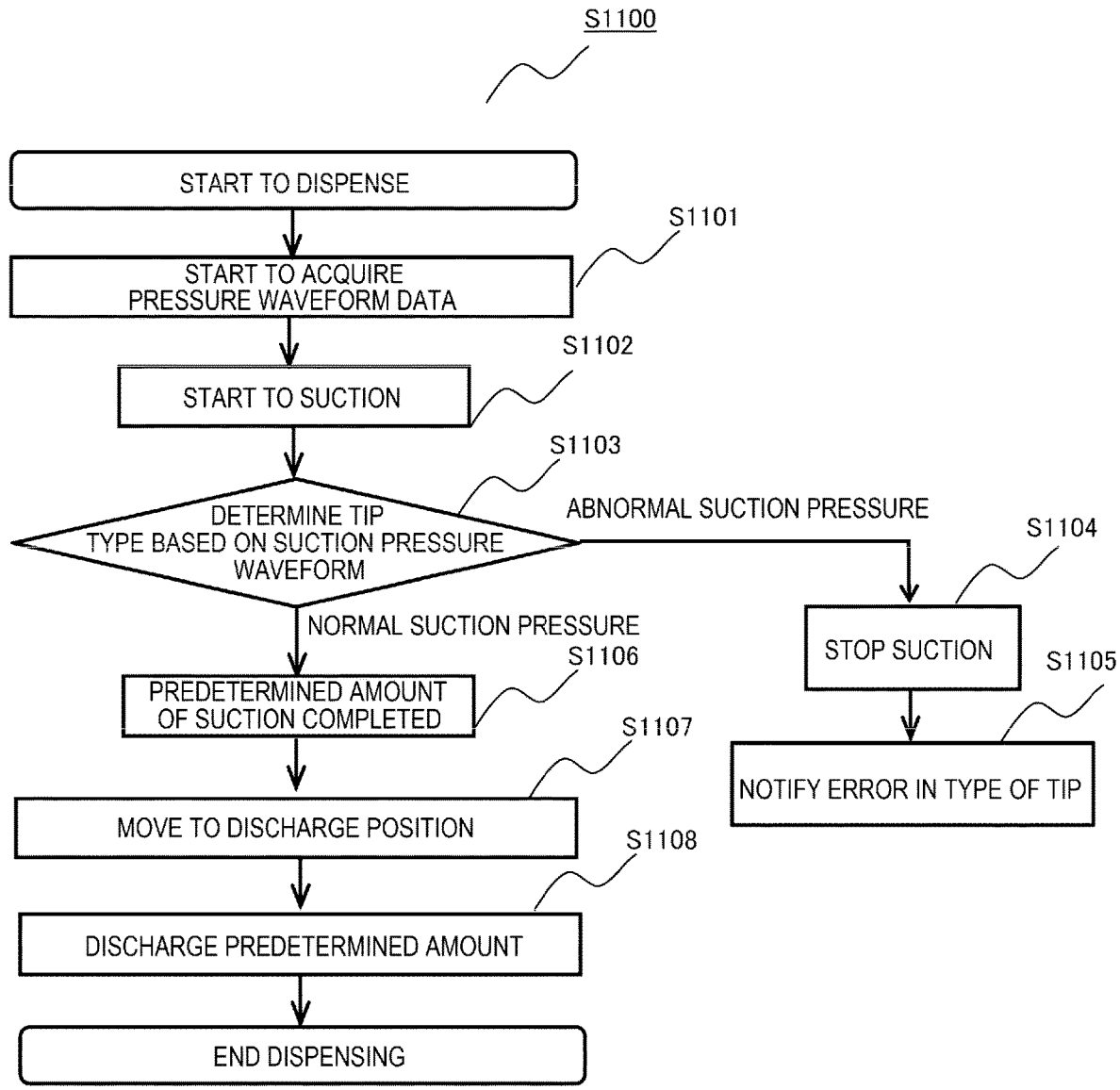

DISPENSING DEVICE AND METHOD

TECHNICAL FIELD

The present invention relates to a dispensing device and method, and particularly to a technique for determining a type of a tip of a dispensing mechanism for examination.

BACKGROUND ART

A dispensing device is used as a method for distributing a liquid such as a specimen and a reagent to another container in medical and biomedical fields. In an examination using a polymerase chain reaction (hereinafter, referred to as PCR) method in such as a gene examination device, since even slight contamination affects an examination result, it is important to prevent contamination in order to obtain a correct examination result.

As an example, PTL 1 discloses an invention for monitoring a pressure in the dispensing device and effectively reducing the occurrence of liquid dripping from a nozzle and an air gap. If the liquid dripping occurs, the dropped liquid droplets may contaminate other containers, and if an air gap occurs, liquid pools may occur at a tip of the nozzle via the air gap. When the liquid is discharged, contamination may occur due to the generation of bubbles or flipping of the bubbles.

In order to cope with these problems, in PTL 1, air suction setting information is information in which air suction conditions defined in advance for each of various dispensing conditions (a shape of the nozzle, a type of the liquid, a target suction amount, and the like), more specifically, an air suction speed va, an air amount upper limit value Va, and the like are recorded, and the air suction setting information is defined based on previous experimental results and the like. In addition, PTL 1 discloses that the liquid dripping can be more reliably prevented or reduced by performing the air suction based on the air suction conditions defined in advance. In the related art, it is intended to prevent contamination by reducing liquid dripping or an air gap generated after the suction of a liquid.

CITATION LIST

Patent Literature

PTL 1: JP2010-256200A

SUMMARY OF INVENTION

Technical Problem

In the related art, there is a device configuration in which the nozzle is washed each time and used repeatedly, but in the examination using the PCR method in such as a gene examination device, even the slight contamination affects the examination result. Therefore, it is common to use a disposable tip for the nozzle. Since the required dispensing amount is different for each examination item, a plurality of types of tips suitable for the dispensing amounts are used. In particular, in a dispensing device having a wide dispensing range, since a large volume dispensing tip or a small volume dispensing tip may be used, there are a wide variety of types of tips. In a case where the plurality of types of tips are used, when suction is performed beyond a tip volume, the inside of the dispensing device may be contaminated. Therefore, it is necessary to determine whether the dispensing amount and the mounted tip match with each other.

For example, a human error such as an installation error in a type of a tip can be considered as a factor. By making a case dedicated such that only a specific tip can be housed, the relation between the tip and a tip case can be uniquely determined, but it cannot be determined whether a tip suitable for the dispensing amount is installed. Although an installation error can be prevented, it is still necessary to determine whether a tip suitable for the dispensing amount is installed.

From the viewpoint of dispensing accuracy, it is important to determine a type of a tip. The larger a tip volume, the larger an air volume inside the tip. Therefore, when the air volume is excessively large relative to the dispensing amount, there is a possibility that no dispensing accuracy can be satisfied.

An object of the invention is to provide a dispensing device and method capable of solving the above problems and preventing contamination in the dispensing device caused by a mismatch between a tip and a dispensing amount at the time of dispensing.

Solution to Problem

In order to achieve the above object, the invention provides a dispensing device for suctioning a liquid sample with a dispensing tip and discharging a predetermined amount of the suctioned liquid sample to perform dispensing. The dispensing device includes a pressure sensor configured to measure an internal pressure of the dispensing device, and a type of the dispensing tip is determined based on a pressure waveform measured by the pressure sensor.

In order to achieve the above object, the invention further provides a dispensing method for a dispensing device for suctioning a liquid sample with a dispensing tip and discharging a predetermined amount of the suctioned liquid sample to perform dispensing. The dispensing method includes: measuring an internal pressure of the dispensing device; and determining a type of the dispensing tip based on a measured pressure waveform.

Advantageous Effects of Invention

According to the invention, it is possible to determine a type of a tip, that is being used, based on characteristics of the pressure waveform.

BRIEF DESCRIPTION OF DRAWINGS

FIG. 1 is a diagram showing an example of a configuration of a dispensing device and a liquid level detection operation according to the present disclosure.

FIG. 2 is a diagram showing a pressure waveform obtained when a piston is operated in a discharge direction to detect a liquid level according to the present disclosure.

FIG. 3 is a diagram showing a pressure waveform obtained when the piston is operated in a suction direction to detect a liquid level according to the present disclosure.

FIG. 4 is a diagram showing a processing flow of a normal dispensing method.

FIG. 5 is a diagram showing a pressure waveform obtained when a predetermined minute amount of air is discharged in a liquid according to a first embodiment.

FIG. 6 is a diagram showing a pressure waveform obtained when a predetermined minute amount of liquid is suctioned in the liquid according to the first embodiment.

FIG. 7 is a diagram showing a dispensing processing flow according to a second embodiment.

FIG. 8 is a diagram showing a pressure waveform obtained when a liquid level detection parameter is freely set and the piston is operated in the discharge direction to detect a liquid level according to the second embodiment.

FIG. 9 is a diagram showing a pressure waveform obtained when the liquid level detection parameter is freely set and the piston is operated in the suction direction to detect a liquid level according to the second embodiment.

FIG. 10 is a diagram showing a pressure waveform obtained when suction is performed beyond a tip volume according to a third embodiment.

FIG. 11 is a diagram showing a dispensing processing flow according to the third embodiment.

DESCRIPTION OF EMBODIMENTS

Hereinafter, embodiments of the present invention, that is, a dispensing device and method will be described with reference to the drawings. The dispensing device suctions a liquid sample with a dispensing tip and discharges a predetermined amount of the suctioned liquid sample to perform dispensing. The dispensing device includes a pressure sensor configured to measure an internal pressure of the dispensing device, and a type of the dispensing tip is determined based on a pressure waveform measured by the pressure sensor. The dispensing method for a dispensing device for suctioning a liquid sample with a dispensing tip and discharging a predetermined amount of the suctioned liquid sample to perform dispensing, includes: measuring an internal pressure of the dispensing device; and determining a type of the dispensing tip based on a measured pressure waveform.

The drawings shown below show specific embodiments according to the invention, but these drawings are for the purpose of understanding the invention, and are not to be used for limiting interpretation of the invention. In the present specification, the pressure means an internal pressure of a pipe of an dispensing device, and is detected by the pressure sensor mounted on the device.

FIG. 1 is a diagram showing a dispensing device 100 that performs pressure-type liquid level detection according to the present disclosure. The dispensing device 100 includes a base 101 having an L-shape as a whole, and a motor 102, which is a drive unit, provided on an upper portion of the base 101. The base 101 is rotatably provided with a screw shaft 104 implemented by a trapezoidal screw, a ball screw or the like that is connected to a rotating shaft of the motor 102 via a coupling 103.

The screw shaft 104 is provided with a slider 106 through which the screw shaft 104 passes, and a nut 105 screwed to the screw shaft 104. The slider 106 is connected to a linear guide 107 provided on the base 101, and the nut 105 and the slider 106 are vertically movable or slidable along a direction of an arrow S shown in the figure. The slider 106 is joined to a piston 108 protruding downward, and is configured to move vertically instead of rotating. As described above, the piston 108 and the piston receiving portion 109 form a pipette mechanism. When the piston 108 is operated, a pressure in a system pipe changes, and the pipette mechanism is equipped with a pressure sensor 113 that measures the change in pressure. A measurement value of the pressure sensor 113 is input to a control computer 116, which is a control unit, and is sequentially stored in a memory of the control computer 116.

A vertical movement of the piston 108 of the pipette mechanism serves as a pump. A tip 110 is mounted to a tip end of the piston receiving portion 109 of the pipette mechanism. A tip removal portion 111 is provided above the tip 110. The tip removal portion 111 is provided with a U-shaped notch or a through hole having a diameter smaller than a diameter of an opening portion of the tip 110. The tip removal portion 111 is normally biased upward by a spring member 112 such as a spring connected to an upper end of the tip removal portion 111 and the base 101, and is configured to move vertically along the arrow S. In order to ensure dispensing into small containers installed in various places in the device, the dispensing device 100 is installed on an automatic stage (not shown) which is freely driven in a horizontal direction and a vertical direction. The control computer 116 controls the dispensing motor 102, which is the drive unit, the automatic stage, and the like.

A liquid 114 to be dispensed and a liquid reservoir 115 storing the fluid are provided, and it is necessary to acquire information on liquid level height of the liquid 114 to be dispensed. In the case of pressure-type liquid level detection, the piston 108 is driven in a suction or discharge direction, and a pressure value at that time is measured by the pressure sensor 113 while air suction or air discharge is performed. When the entire dispensing device 100 is driven downward in a vertical direction by the automatic stage or the like ((a) of FIG. 1) and comes into contact with a liquid level of the liquid 114 to be dispensed ((b) of FIG. 1) while the air suction or the air discharge is performed, a change in pressure value occurs at the time of the air suction or the air discharge by suctioning or discharging a minute amount of the liquid 114 to be dispensed, this change in pressure value is captured, the automatic stage and the piston 108 in the vertical direction are stopped and the liquid level is detected.

FIG. 2 is an example of a pressure waveform 200 obtained when the liquid level is detected by a discharge method. In the discharge method, a pressure generated when the dispensing device 100 connected to the automatic stage is driven in a vertically downward direction while the piston 108 is driven in the discharge direction is measured by the pressure sensor 113. When a tip end of the tip comes into contact with the liquid level, the tip end portion is blocked by the liquid, and the pressure is increased to a positive pressure side due to the discharged air. A pressure waveform 201 is a waveform obtained when a small volume dispensing tip is used. A pressure waveform 202 is a waveform obtained when a large volume dispensing tip is used.

Although a piston drive speed and an automatic stage drive speed can be freely set, the pressure waveforms 201 and 202 shown here are waveforms measured using the same operation parameters. A pressure before the start of air discharge 203 is an atmospheric pressure 204.

At air discharge 205, the piston 108 begins to move in the discharge direction and the pressure increases to a pressure value 206. The piston 108 begins to come into contact with the liquid 114 to be dispensed from a time point 207, and approximate straight lines 209 and 210 are obtained based on the pressure values that change during a time 208. In addition to capturing these changes in pressure, the control computer 116 performs control to stop the piston 108 and the automatic stage at a time point 213 at which the pressure value exceeds pressure threshold values 211 and 212 that are obtained from a previous experiment and stored in the memory. The information on the liquid level height is acquired by the above operations. At the time point 213, maximum pressure values 214 and 215 were measured, respectively.

FIG. 3 is an example of a pressure waveform 300 when the liquid level is detected by a suction method. A pressure generated when the dispensing device 100 connected to the automatic stage is driven in the vertically downward direction while the piston 108 is driven in the suction direction is measured by the pressure sensor 113. A pressure before the start of air suction 301 is an atmospheric pressure 302. The pressure is reduced to a pressure value 304 due to air suction 303, and the tip end of the tip starts to come into contact with the dispensing liquid 114 from a time point 305, and the liquid is suctioned into the tip.

A pressure waveform 306 is a waveform obtained when a small volume dispensing tip is used. A pressure waveform 307 is a waveform obtained when a large volume dispensing tip is used. Although the piston drive speed and the automatic stage drive speed can be freely set, the pressure waveforms 306 and 307 shown here are waveforms measured using the same operation parameters.

Approximate straight lines 309 and 310 are obtained from the pressure values that change during a time 308. The control computer 116 stops the piston 108 and the automatic stage at a time point 313 at which the pressure value exceeds the pressure threshold values 311 and 312 that are obtained from verification in advance and stored in the memory, in addition to capturing changes in these pressures based on measurement values of the pressure sensor 113. The information on the liquid level height is acquired by the above operations. Minimum pressure values measured at the time points 313 are 314 and 315, respectively.

FIG. 4 is a diagram showing a processing flow S400 of a normal dispensing method. Next, with reference to FIG. 4, operations S401 to S410 during dispensing performed by the dispensing device will be described.

(S401)

Pressure waveform data is started to be acquired, and the atmospheric pressure 204 and the atmospheric pressure 302, which serve as references at the time of the liquid level detection determination, are measured and stored in the memory or the like of the control computer 116.

(S402)

In order to acquire information on the liquid level height, the automatic stage is driven to move vertically downward toward the liquid level. At this time, the piston 108 can be freely set to operate in the suction direction or the discharge direction. The pressure value 206 is measured by the pressure sensor 113 when the piston 108 is operated in the discharge direction, and the pressure value 304 is measured when the piston 108 is operated in the suction direction.

(S403)

At the liquid level contact time points 207 and 305, the tip end of the tip reaches and comes into contact with the liquid level.

(S404)

When the piston 108 is operated in the discharge direction, the approximate straight line 209 or 210 is obtained from the pressure that changes from the liquid level contact time point 207. When the piston 108 is operated in the suction direction, the approximate straight line 309 or 310 is obtained from the pressure that changes from the liquid level contact time point 305. Conditions under which the liquid level is detected and the piston 108 and the automatic stage are stopped are that the pressure exceeds the pressure threshold value obtained from the previous experiment and that a slope of the approximate straight line is equal to or greater than a certain value.

(S405)

A stopped position in the vertical direction is stored in the memory.

(S406)

When the liquid level is detected by an operation of the piston 108 in the discharge direction, the piston is moved to a predetermined amount suction start position from a position separated vertically upward from the liquid level of the liquid 114 to be dispensed. When the liquid level is detected by an operation of the piston 108 in the suction direction, a minute amount of liquid suctioned during a liquid level entry time 308 is discharged at a position vertically above the liquid level of the liquid 114 to be dispensed. Thereafter, the piston 108 is moved to a predetermined suction start position.

(S407)

The set predetermined amount of liquid is suctioned.

(S408)

The dispensing device 100 is driven vertically and horizontally by the automatic stage to which the dispensing device 100 is mounted, and is moved to a predetermined discharge position.

(S409)

A predetermined amount of liquid is discharged.

In the discharge method described above, since the sample is not suctioned at the time of detection, there is no surplus liquid remaining in the tip. In the suction method, there is a possibility that the presence or absence of clot or the like, which causes clogging of the tip at the time of suction, can be detected before the start of the dispensing main suction.

First Embodiment

The present embodiment is an example of a dispensing device and method for determining a type of a tip based on an approximate straight line of a change in pressure which is obtained by discharging a minute amount of air or suctioning a minute amount of air in a state where a tip end of the tip is in contact with the liquid in advance. A tip determination method according to the present embodiment will be described with reference to FIGS. 5 and 6.

FIG. 5 shows an example of a pressure waveform 500 obtained when a minute amount of air is discharged into the liquid. A pressure waveform 501 is a waveform obtained when a small volume dispensing tip is used. A pressure waveform 502 is a waveform obtained when a large volume dispensing tip is used. A pressure value 504 is measured by the pressure sensor in a state where the tip end of the tip is in contact with the liquid. When a minute amount of air is discharged during a time 505 starting from a time point 503, pressure values 508 and 507 are measured at a piston stop time point 506, respectively.

Approximate straight lines 509 and 510 are obtained from a change in pressure obtained during the time 505. As is clear from the figure, since these approximate straight lines have characteristics for each type of tip, it is possible to determine the type of the tip by comparing the pressure value at the time of stop or a slope of the approximate straight line with a value measured in advance.

FIG. 6 is an example of a pressure change waveform 600 obtained when a minute amount of liquid is suctioned. A pressure waveform 601 is a waveform obtained when a small volume dispensing tip is used. A pressure waveform 602 is a waveform obtained when a large volume dispensing tip is used. A pressure value 603 is measured by the pressure sensor in a state where the tip end of the tip is in contact with the liquid. When a minute amount of liquid is suctioned during a time 605 starting from a time point 604, the pressure values 608 and 607 are measured at a piston stop time point 606, respectively.

Approximate straight lines 609 and 610 are obtained from a change in pressure obtained during the time 605. Since these approximate straight lines have characteristics for each type of tip, it is possible to determine the type of the tip by comparing the pressure value at the time of stop or the slope of the approximate straight line with a value measured in advance.

According to the dispensing device, a liquid level detection method using the pressure waveform, and a tip type determination method of the present embodiment, a type of a tip being used can be determined based on a difference in characteristics of the pressure waveform, the relation between the pressure waveform during suction and the suction time, and the like.

Second Embodiment

A second embodiment is a tip type determination method using a pressure waveform obtained at the time of liquid level detection. Steps S701 to S712 of a tip type determination flow S700 using the liquid level detection in FIGS. 3 and 7 will be described with reference to FIGS. 8 and 9. An operation processing subject of the tip type determination flow S700 is the control computer 116, which is a control unit, or the like.

(S701)

Pressure waveform data is started to be acquired, and the atmospheric pressure 204 and the atmospheric pressure 302, which serve as a reference at the time of the liquid level detection determination, are measured by the pressure sensor 113 and stored.

(S702)

In order to acquire the information on the liquid level height, the automatic stage is driven to move vertically downward toward the liquid level. At this time, the piston 108 can be freely set to operate in the suction direction or the discharge direction. A pressure value 206 is measured by the pressure sensor 113 when the piston 108 is operated in the discharge direction, and a pressure value 304 is measured when the piston 108 is operated in the suction direction.

(S703)

At the liquid level contact time points 207 and 305, the tip end of the tip reaches and comes into contact with the liquid level.

(S704)

Conditions under which the piston and the automatic stage are stopped at the time of liquid level detection are that the pressure exceeds the pressure threshold value stored in advance and that the slope of the approximate straight line is equal to or greater than a certain value.

When the piston is operated in the discharge direction and a large volume dispensing tip is used, at the time point 213, the piston stops, and an approximate straight line 210 is obtained from the pressure waveform 202. The case where a pressure threshold value and a slope condition of the approximate straight line related to a liquid level detection operation are set as parameters for the large volume dispensing tip will be considered. Since when a small volume dispensing tip is used in this state, a set pressure threshold value and the slope condition are set to be smaller than conditions for the small volume dispensing tip, the time until the liquid level is detected and the piston is stopped is shortened. Therefore, a pressure waveform corresponding to the small volume dispensing tip has a shape indicated by 801. At a time point 802, the piston stops, and an approximate straight line 803 is obtained.

When the piston is operated in the suction direction, for a large volume dispensing tip, the piston stops at the time point 313, and an approximate straight line 310 is obtained from the pressure waveform 307. Similarly, the case where a pressure threshold value and a slope condition of the approximate straight line related to a liquid level detection operation are set as parameters for the large volume dispensing tip will be considered. Since when a small volume dispensing tip is used in this state, a set pressure threshold value is larger and the slope condition is smaller than conditions for the small volume dispensing tip, the time until the liquid level is detected and the piston is stopped is shortened.

Therefore, a pressure waveform corresponding to the small volume dispensing tip has a shape indicated by 901. At a time point 902, the piston stops, and an approximate straight line 903 is obtained.

(S705)

A pressure waveform acquired in a liquid level detection process of S701 to S704 is used. When the piston is operated in the discharge direction and the liquid level detection is performed, a type of the tip is determined based on the approximate straight lines 210 and 803. When the piston is operated in the suction direction and the liquid level detection is performed, the type of the tip is determined based on the approximate straight lines 310 and 903.

Here, a pressure P measured by the pressure sensor 113 will be considered by taking the liquid level detection in which the piston is operated in the suction direction as an example. A pressure $\Delta P$ is considered to be $\Delta P = 2 \times \sigma/(D/2)$. $\sigma$ represents a surface tension of the liquid, and D represents a tip end inner diameter of the tip. From this equation, it can be seen that a suction pressure value has the surface tension $\sigma$ of the suction liquid and the tip end inner diameter D of the tip as parameters.

In the small volume dispensing tip and the large volume dispensing tip described as examples, since a tip end inner diameter of the small volume dispensing tip is smaller than that of the large volume dispensing tip, it can be seen that the change in pressure per unit time from the time point 313 shown in FIG. 3 is large. It can be seen that when the same liquid is suctioned, the change in pressure, that is, the slope of the approximate straight line is larger in the tip having a small tip end. Therefore, it can be said that tips having different tip end diameters have different feature data in the slope of the obtained approximate straight line.

An air volume in the tip varies depending on a dispensing volume. A tip with a large dispensing volume generally has a large internal air volume in order to suction more liquid. When an amount of air, which is a compressive fluid, is large, a delay occurs in a value detected by the pressure sensor, so that the slope of the approximate straight line per unit time is larger for a tip having a smaller tip volume. That is, it can be seen that the slopes of the approximate straight lines have different characteristics even when the tip end diameters of the tips are the same.

By using these characteristics and comparing these characteristics with the pressure waveforms obtained from verification results in advance, it is determined whether an appropriate tip is being used.

(S706)

An error notification that a tip inappropriate for the dispensing is mounted is output. When a tip having a sufficient volume for the dispensing amount is mounted, the dispensing itself is possible. However, since the air volume inside the tip is large, there is a possibility that the required dispensing accuracy cannot be satisfied. Here, by detecting an error in the mounted tip, it is possible to ensure the dispensing accuracy of the specification.

(S707)

A stopped position in the vertical direction is stored.

(S708)

When the liquid level is detected by an operation of the piston 108 in the discharge direction, the piston is moved to a predetermined amount suction start position from a position separated vertically upward from the liquid level of the liquid 114 to be dispensed. When the liquid level is detected by an operation of the piston 108 in the suction direction, a minute amount of liquid suctioned during a liquid level entry time 308 is discharged at a position vertically above the liquid level of the liquid 114 to be dispensed. Thereafter, the piston 108 is moved to a predetermined suction start position.

(S709)

A set predetermined amount of liquid is suctioned.

(S710)

The dispensing device 100 is driven vertically and horizontally by the automatic stage to which the dispensing device 100 is mounted, and is moved to a predetermined discharge position.

(S711)

A predetermined amount of liquid is discharged.

According to the present embodiment, it is possible to perform the tip type determination using the pressure waveform obtained at the time of the liquid level detection.

Third Embodiment

The first embodiment and the second embodiment describe an effective determination method when there is a large difference in the tip volume or the tip end diameter. For example, in a case of tips having dispensing volumes of 10 microliters and 20 microliters, the differences in both the volume and the tip end diameter are small, so that determination cannot be made in the first embodiment and the second embodiment. In such a case, a type of a tip is determined using a method shown in the present embodiment.

Tip type determination according to the present embodiment will be described with reference to FIGS. 10 and 11. Here, it is assumed that a commercially available disposable tip with a filter is used.

FIG. 10 is an example of a pressure waveform 1000 obtained when a liquid is suctioned. A pressure waveform 1001 is a pressure waveform obtained when excessive liquid is suctioned beyond a tip volume. In a pre-suction time 1002, the automatic stage is moved in the vertically downward direction to a liquid level height stored in advance. The liquid is suctioned in a suction time 1003, and the suctioned liquid enters the filter at an excess suction time 1004, and a pressure is reduced. A dotted line 1005 in FIG. 10 indicates a normal pressure waveform.

FIG. 11 is an operation flow S1100 according to the present embodiment. A tip type determination method will be described below with reference to flows S1101 to S1108.

(S1101)

Pressure waveform data is started to be acquired, and an atmospheric pressure that serves as a reference is measured and stored.

(S1102)

The automatic stage to which the dispensing device 100 is connected is moved in the vertically downward direction to a pre-stored liquid level height at which the liquid can be suctioned, and the liquid is started to be suctioned.

(S1103) Tip Type Determination based on Suction Pressure Waveform

A type is determined based on a change in suction pressure waveform continuously acquired from S1101. Operation parameters for suction are set to values verified by a dispensing test or the like, based on liquid physical constants (viscosity, surface tension, specific gravity, contact angle) and dispensing amounts of various liquids. Therefore, it is possible to calculate a suction amount at any time.

That is, it is possible to predict when the volume will be exceeded for each tip based on the operation parameters for suction. When the suction is performed normally, a suction pressure remains stable at a certain pressure, and returns to a positive pressure side when the suction stops. The suction pressure decreases when the liquid reaches the filter beyond the tip volume.

For example, a case of using two types of tips having dispensing volumes of 10 microliters and 20 microliters is considered. When a 20-microliter dispensing operation is performed with a tip having a volume of 10 microliters, the tip volume is exceeded at a certain time. When the suction pressure decreases at a certain time, it can be determined that excessive suction is being performed beyond the tip volume, so that the type of the tip can be determined.

(S1104)

A suction operation is stopped, and the type of the tip is determined.

(S1105)

Based on a determination result, an error notification that a tip inappropriate for the dispensing is mounted is output.

(S1106)

The suction operation is completed.

(S1107)

The dispensing device 100 is driven vertically and horizontally by the automatic stage to which the dispensing device 100 is mounted, and is moved to a predetermined discharge position.

(S1108)

A predetermined amount of liquid is discharged.

According to the present embodiment, it is possible to determine the type of a tip with a smaller dispensing volume.

The invention is not limited to the embodiments described above and includes various modifications. For example, the embodiments described above are described in detail for better understanding of the invention, and the invention is not necessarily limited to embodiments including all configurations described above.

Further, although an example of creating a program that implements a part or all of the configurations, functions, and control computers described above and the like is mainly described, it is needless to say that a part or all of them may be implemented by hardware, for example, by designing an integrated circuit. That is, all or a part of functions of a processing unit may be implemented by, for example, an integrated circuit such as an application specific integrated circuit (ASIC) or a field programmable gate array (FPGA) instead of the program.

REFERENCE SIGNS LIST 100 dispensing device
101 base
102 motor
103 coupling
104 screw shaft 105 nut
106 slider
107 linear guide
108 piston
109 piston receiving portion
110 disposable tip
111 tip removal portion
112 spring member
113 pressure sensor
114 liquid to be dispensed
115 liquid reservoir
116 control computer

The invention claimed is:

1. A dispensing device for suctioning a liquid sample with a dispensing tip and discharging a predetermined amount of the suctioned liquid sample to perform dispensing, the dispensing device comprising:
   a pressure sensor configured to measure an internal pressure of the dispensing device;
   a pipette mechanism comprising a piston and a receiving piston configured to perform suction and discharge;
   an automatic drive stage to drive the dispensing device in a vertical direction;
   a drive unit configured to drive the piston of the pipette mechanism, wherein the dispensing tip is mounted on the pipette mechanism and the drive unit is configured to drive the pipette mechanism in a suction or discharge direction; and
   a control unit configured to:
   control the drive unit based an output of the pressure sensor,
   determine a type of the dispensing tip based on a pressure waveform measured by the pressure sensor while the pipette mechanism is performing suction or discharge, by:
   driving the dispensing device with the automatic stage in the vertically downward direction while the piston is driven in the suction direction or in the discharge direction and while measuring the pressure with the pressure sensor,
   detecting that the dispensing tip reaches a liquid level using the pressure measurements,
   obtaining a slope of an approximate straight line of a pressure waveform obtained during a time while the drive unit is performing suction or discharge from the time of liquid level detection, and
   comparing the slope of the approximate straight line with a value measured in advance, in order to determine the type of dispensing tip.

2. The dispensing device according to claim 1, wherein the control unit is configured to output an error notification upon determining that an inappropriate dispensing tip is mounted as a result of determining the type of the dispensing tip.

3. The dispensing device according to claim 1, wherein the control unit is configured to store a liquid level position upon determining that an appropriate dispensing tip is mounted as a result of determining the type of the dispensing tip.

4. The dispensing device according to claim 1, wherein a dispensing tip with a filter is used as the dispensing tip, and wherein the type of the dispensing tip is determined based on the pressure waveform obtained when a liquid is suctioned beyond a specification volume of the dispensing tip with the filter.

5. A dispensing method for a dispensing device for suctioning a liquid sample with a dispensing tip and discharging a predetermined amount of the suctioned liquid sample to perform dispensing, the dispensing method comprising:
   measuring an internal pressure of the dispensing device;
   performing suction and discharge, by a pipette mechanism including a piston and a receiving piston;
   driving the dispensing device in a vertical direction;
   driving, by a drive unit, the piston of the pipette mechanism, and mounting the dispensing tip on the pipette mechanism, and driving, by the drive unit, the pipette mechanism in a suction or discharge direction;
   controlling, by a control unit, the drive unit based an output of the pressure sensor; and
   determining, by the control unit, a type of the dispensing tip based on a pressure waveform measured by the pressure sensor while the pipette mechanism is performing suction or discharge, by:
   driving the dispensing device with the automatic stage in the vertically downward direction while the piston is driven in the suction direction or in the discharge direction and while measuring the pressure with the pressure sensor,
   detecting that the dispensing tip reaches a liquid level using the pressure measurements,
   obtaining a slope of an approximate straight line of a pressure waveform obtained during a time while the drive unit is performing suction or discharge from the time of liquid level detection, and
   comparing the slope of the approximate straight line with a value measured in advance, in order to determine the type of dispensing tip.

6. The dispensing method according to claim 5, further comprising:
   outputting an error notification upon determining that an inappropriate dispensing tip is mounted as a result of determining the type of the dispensing tip.

7. The dispensing method according to claim 5, further comprising:
   storing a liquid level position upon determining that an appropriate dispensing tip is mounted as a result of determining the type of the dispensing tip.

8. The dispensing method according to claim 5, wherein a dispensing tip with a filter is used as the dispensing tip; and wherein the type of the dispensing tip is determined based on the pressure waveform obtained when a liquid is suctioned beyond a specification volume of the dispensing tip with the filter.

* * * * *